US012122925B2

(12) United States Patent
Kim

(10) Patent No.: US 12,122,925 B2
(45) Date of Patent: Oct. 22, 2024

(54) INK COMPOSITION FOR WRITING INSTRUMENT AND WRITING INSTRUMENT HAVING THE SAME

(71) Applicant: SUHAN CORPORATION, Hoengseong-eup (KR)

(72) Inventor: Jung Eun Kim, Hoengseong-eup (KR)

(73) Assignee: SUHAN CORPORATION (KR)

( * ) Notice: Subject to any disclaimer, the term of this patent is extended or adjusted under 35 U.S.C. 154(b) by 376 days.

(21) Appl. No.: 16/603,212

(22) PCT Filed: Feb. 25, 2019

(86) PCT No.: PCT/KR2019/002281
§ 371 (c)(1),
(2) Date: Oct. 4, 2019

(87) PCT Pub. No.: WO2019/168312
PCT Pub. Date: Sep. 6, 2019

(65) Prior Publication Data
US 2021/0079244 A1 Mar. 18, 2021

(30) Foreign Application Priority Data
Feb. 27, 2018 (KR) ........................ 10-2018-0023540

(51) Int. Cl.
*C09D 11/18* (2006.01)
*C08K 5/17* (2006.01)
*C08L 33/08* (2006.01)
*C08L 71/02* (2006.01)
*C09D 11/17* (2014.01)

(52) U.S. Cl.
CPC ................ *C09D 11/18* (2013.01); *C08K 5/17* (2013.01); *C08L 33/08* (2013.01); *C08L 71/02* (2013.01); *C09D 11/17* (2013.01)

(58) Field of Classification Search
CPC .......... C09D 11/18; C09D 11/17; C08K 5/17; C08L 71/02; C08L 33/08
USPC .......................................................... 523/161
See application file for complete search history.

(56) References Cited

U.S. PATENT DOCUMENTS

2004/0173121 A1* 9/2004 Fukuo .................... C09D 11/16 106/31.89

FOREIGN PATENT DOCUMENTS

| | | | | |
|---|---|---|---|---|
| JP | S5974175 A | | 4/1984 | |
| JP | 3934444 B2 | | 10/2003 | |
| JP | 2003277671 A | * | 10/2003 | ............. C09D 11/18 |
| JP | 2003327891 A | | 11/2003 | |
| JP | 2004082707 A | | 3/2004 | |

(Continued)

OTHER PUBLICATIONS

Ito, JP 2003-277671 A machine translation in English, Oct. 2, 2003 (Year: 2003).*

(Continued)

*Primary Examiner* — David T Karst
(74) *Attorney, Agent, or Firm* — Womble Bond Dickinson US (LLP)

(57) ABSTRACT

Embodiments of the present disclosure provides an ink composition for a writing instrument comprising a colorant and water, wherein the ink composition further comprises a thickener including polyethylene glycol or polypropylene glycol having a molecular weight between 200 and 1000 and an acrylic resin having an amine.

4 Claims, 1 Drawing Sheet

-H+

+H+

(56) References Cited

FOREIGN PATENT DOCUMENTS

| | | | |
|---|---|---|---|
| JP | 2005008873 | A | 1/2005 |
| KR | 20020008156 | A | 1/2002 |

OTHER PUBLICATIONS

The International Search Report of PCT Application No. PCT/KR2019/002281, mailed Jun. 10, 2019, 7 pages.

* cited by examiner

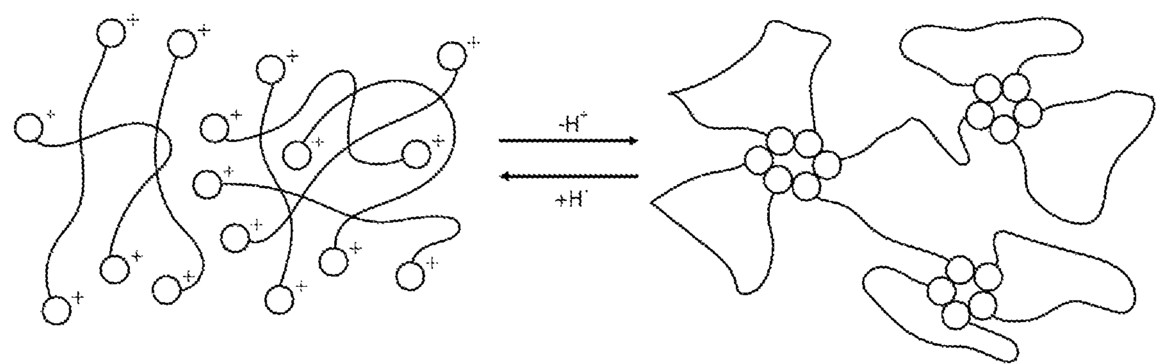
-H+
+H+

INK COMPOSITION FOR WRITING INSTRUMENT AND WRITING INSTRUMENT HAVING THE SAME

CROSS-REFERENCE TO RELATED APPLICATIONS

This patent application is a U.S. National Phase Application Under 35 U.S.C § 371 of International Application No. PCT/KR2019/002281, filed on 25 Feb. 2019, entitled "INK COMPOSITION FOR WRITING INSTRUMENT AND WRITING INSTRUMENT HAVING THE SAME," which claims the priority of Korean Patent Application No. 10-2018-0023540, filed on Feb. 27, 2018 in the Korean Intellectual Property Office.

1. TECHNICAL FIELD

The present disclosure relates to an ink composition for a writing instrument and a writing instrument having an ink composition thereof.

2. BACKGROUND ART

Conventionally, polysaccharides and/or modified systems thereof (see e.g. Patent Document 1) are used as a thickening agent (thickener) for an ink composition for a writing instrument. With such a thickener, it is possible to provide an ink composition for a writing instrument exhibiting shear-thinning behavior.

Patent Document 1: Japanese Patent Laid-open Publication No. 1984-074175 (see e.g., Claims and Examples)

SUMMARY

Although a thickener is used to obtain a predetermined thickening effect for an ink composition for a writing instrument, when the amount of the thickener used is increased certain problems are known to occur such as reduction in fluidity, increased likelihood for occurrence of splitting of written lines, and instability of written lines.

On the other hand, when the amount of the thickener used is reduced in order to resolve the above-mentioned problem, scratching will be caused and feeling of writing will worsen.

The object of the present disclosure is to provide an ink composition for a writing instrument which has high fluidity and does not cause scratching during writing while maintaining the desired/predetermined thickening effect, and a writing instrument having such an ink composition.

One embodiment of the present disclosure provides an ink composition for a writing instrument comprising a colorant and water, wherein the composition further comprises a thickener including polyethylene glycol or polypropylene glycol having a molecular weight between 200 and 1000 and an acrylic resin having an amine.

Various embodiments of the present disclosure provide an ink composition for a writing instrument with high fluidity which provides a desired/predetermined thickening effect and does not cause scratching during writing, and a writing instrument having such an ink composition.

BRIEF DESCRIPTION OF DRAWINGS

FIG. 1 is a view describing an acrylic resin having an amine, whereas the acrylic resin is implemented in an ink composition for a writing instrument according to one embodiment.

DETAILED DESCRIPTION

Hereinafter, embodiments of the present disclosure will be described in more detail.

[Polyethylene Glycol or Polypropylene Glycol and Acrylic Resin Having Amine]

An ink composition for a writing instrument according to an embodiment of the present disclosure includes a colorant, water, and a thickener, wherein as the thickener, polyethylene glycol or polypropylene glycol may be combined with an acrylic resin having an amine.

Polyethylene glycol or polypropylene glycol may have a molecular weight of 200 or more and 1000 or less, preferably 200 or more and 800 or less. Polyethylene glycol or polypropylene glycol may be used in the amount of between 10% and 40% by weight, preferably between 15% and 30% by weight, more preferably between 20% and 30% by weight. An acrylic resin may be used in the amount between 1% and 5% by weight, preferably between 1.5% and 3% by weight.

When a solvent containing polyethylene glycol or the polypropylene glycol having a molecular weight of less than 200 is used, the likelihood of bleeding of ink is increased. On the contrary, it may be undesirable when the molecular weight of polyethylene glycol or polypropylene glycol exceeds 1000, because the bleeding performances and preservative performances may be reduced. Furthermore, when an acrylic resin content is less than 1% by weight, blobbing and skipping may occur. On the contrary, when an acrylic resin content exceeds 5% by weight, feeling of writing may worsen and skipping may occur.

As for an acrylic resin, an acrylate copolymer may be used. An acrylic resin having an amine according to the present disclosure may preferably be thickened with an alkali. Viscosity is increased by bonding of an acrylic resin with amines, which is also effective in preventing ink leakage.

[Ink Composition for Writing Instrument]

The ink composition for a writing instrument of the present disclosure may contain a colorant, a water-soluble solvent, a dispersant, a lubricant, a pH adjuster, a preservative, a rust inhibitor, a disinfectant, a synthetic resin, etc. in addition to an acrylic resin having an amine, and a glycol such as polyethylene glycol or polypropylene glycol.

[Acrylic Resin with Amine]

The ink composition for a writing instrument of the present embodiment includes an acrylic resin having an amine. An acrylic resin having an amine is ionized under alkaline conditions, and thus as shown in FIG. 1, amine groups are hydrogen-bonded to each other and aggregated. When an acrylic resin having an amine is aggregated as described above, thickening effect emerges to the ink composition. In addition, when a shear force is applied to the aggregate of an acrylic resin having an amine, the aggregation is released, causing shear-thinning that lowers the viscosity. Such thickening effect and shear-thinning effect are desirable for holding the ink in the ink reservoir of the writing instrument and also for writing.

[Polyethylene Glycol or Polypropylene Glycol]

The ink composition for a writing instrument of the present embodiment includes polyethylene glycol or polypropylene glycol. When polyethylene glycol or polypropylene glycol and an aggregate of acrylic resin having the above-mentioned amine is combined, an even more preferable ink composition for a writing instrument can be obtained. For example, in order to simplify how the ink composition is held in the reservoir within the writing instrument, by simply increasing the amount (concentration) of an acrylic resin having an amine (and the aggregate thereof) and thereby increasing the viscosity, feeling of writing will worsen since the viscosity cannot be lowered sufficiently when writing. However, it has been found that, instead of simply increasing the content of an acrylic resin having an amine, the appropriate combination of polyethylene glycol or polypropylene glycol can very suitably thicken the ink composition without impairing the feeling of writing. That is, it is conceived that polyethylene glycol or polypropylene glycol can link the aggregations of an acrylic resin having the above-mentioned amine to provide a thickening effect.

On the other hand, when a shear force is applied to the aggregates of an acrylic resin having an amine which are linked with polyethylene glycol or polypropylene glycol, it is conceived that the effect of polyethylene glycol or polypropylene glycol connecting the aggregates is released. It has been found that when the ink composition is thickened by the aggregates of an acrylic resin having an amine linked with polyethylene glycol or polypropylene glycol, the ink composition for a writing instrument having a desired/predetermined viscosity can be obtained without impairing the feeling of writing and while avoiding occurrences of scratching.

Examples of the colorant which may be used in the present disclosure include a pigment and a water-soluble dye.

An arbitrary pigment may be used, without any particular limitation on the pigment type, from any of inorganic and organic pigments conventionally used for writing instruments such as for water-based pens.

Examples of inorganic pigment colorants may include carbon black, black iron oxide, C.I.PIGMENT RED 2, 3, 5, 17, 22, 38, 41, 48:2, 48:3, 49, 50:1, 53:1, 57:1, 58:2, 60, 63:1, 63:2, 64:1, 88, 112, 122, 123, 144, 146, 149, 166, 168, 170, 176, 177, 178, 179, 180, 185, 190, 194, 206, 207, 209, 216, and 245, C.I.PIGMENT ORANGE 5, 10, 13, 16, 36, 40, 43, C.I.PIGMENT VIOLET 19, 23, 31, 33, 36, 38, and 50, C.I.PIGMENT BLUE 2, 15, 15:1, 15:2, 15:3, 15:4, 15:5, 16, 17, 22, 25, 60, and 66, C.I.PIGMENT BROWN 25 and 26, C.I.PIGMENT YELLOW 1, 3, 12, 13, 24, 93, 94, 95, 97, 99, 108, 109, 110, 117, 120, 139, 153, 166, 167, and 173, C.I.PIGMENT GREEN 7, 10, and 36, and the like. These may be used alone or in combination of two or more.

Furthermore, Disperse series manufactured by DIC Corporation, Fuji SP series manufactured by Fuji Pigment Co., Ltd., MicroPigmo series and MicroJet series manufactured by Orient Chemical Industries Co., Ltd., in which the pigments are dispersed in an aqueous medium, may be used alone or in combination of two or more thereof.

In addition, examples of organic pigment colorants may include, for example, azo lakes, insoluble azo pigments, chelate azo pigments, phthalocyanine pigments, perylene and perinone pigments, anthraquinone pigments, quinacridone pigments, dye lakes, nitro pigments, nitroso pigments, and the like. Specific examples may include phthalocyanine blue (C.I.74160), phthalocyanine green (C.I.74260), Hansa yellow 3G (C.I.11670), diazo yellow GR (C.I.21100), permanent red 4R (C.I.12335), brilliant carmine 6B (C.I.15850), quinacridone red (C.I.46500), and the like. Plastic pigments constituted from particles of styrene or acrylic resin may also be used. Further, hollow resin particles having voids in the insides of the particles may be used as white pigments or resin particles (pseudo pigments) colored with basic dyes which are excellent in color developability, which will be described later.

As water-soluble dye, all of direct dyes, acid dyes, edible dyes, and basic dyes may be used.

Examples of the direct dyes may include C.I. Direct Black 17, 19, 22, 32, 38, 51, and 71, C.I. Direct Yellow 4, 26, 44, and 50, C.I. Direct Red 1, 4, 23, 31, 37, 39, 75, 80, 81, 83, 225, 226, and 227, C.I. Direct Blue 1, 15, 71, 86, 106, and 119, and the like.

Examples of the acidic dyes may include C.I. Acid Black 1, 2, 24, 26, 31, 52, 107, 109, 110, 119, and 154, C.I. Acid Yellow 7, 17, 19, 23, 25, 29, 38, 42, 49, 61, 72, 78, 110, 127, 135, 141, and 142, C.I. Acid Red 8, 9, 14, 18, 26, 27, 35, 37, 51, 52, 57, 82, 87, 92, 94, 115, 129, 131, 186, 249, 254, 265, and 276, C.I. Acid Violet 18, and 17, C.I. Acid Blue 1, 7, 9, 22, 23, 25, 40, 41, 43, 62, 78, 83, 90, 93, 103, 112, 113, and 158, C.I. Acid Green 3, 9, 16, 25, and 27, and the like.

Most of the edible dyes are included in the direct dyes or the acid dyes, but C.I. Food Yellow 3 may be one example that is not included.

Examples of the basic dyes may include C.I. Basic Yellow 1, 2, and 21, C.I. Basic Orange 2, 14, and 32, C.I. Basic Red 1, 2, 9, and 14, C.I. Basic Brown 12, C.I. Basic Black 2 and 8, and the like.

These colorants may be used alone or in combination of two or more.

As an ink reservoir material for containing the ink, a transparent or semitransparent polymer compound that enables identification of the residual amount of ink such as polyethylene or polypropylene may be used, or an opaque polymer compound or metal may be used as an alternative. Furthermore, in order to prevent adhesion of the residual ink on the inner walls of the ink reservoir, inside of the ink reservoir may be treated with silicone or petroleum-based grease. It is preferable to inject an ink follower as a backflow inhibitor at the rear end surface of the ink injected to prevent leakage or drying of the ink from the rear end surface thereof.

As an ink follower, an ink backflow inhibit or obtained by gelling of a nonvolatile liquid may be used, and a plastic floater may further be added.

The tip of a pen may be made of metal or synthetic resin. As a metal, for example, zinc, brass or stainless steel may be used. As a synthetic resin, for example, a polyacetal resin, a polybutylene terephthalate resin, an aromatic nylon resin, a modified polyphenylene ether resin or a polyacrylate resin or the like may be used.

The ball of a pen may be made of an appropriately selected material, for example, a resin, a cemented carbide such as a tungsten carbide, a stainless steel, or a ceramic that may be harder than the tip material. Additionally, it may be preferable to have at least one or more of titanium oxide, aluminum oxide and silicon oxide on at least the surface thereof. The ball may have a diameter of, for example, between 0.1 mm and 2 mm, but is not limited thereto. An elastic body such as a coil spring may be disposed inside the tip to improve the sealing property of the tip with the ball.

EXAMPLES

The present disclosure will now be described in further detail with reference to the following examples and comparative examples, but the present disclosure is not limited to the following examples.

Examples 1 to 4 and Comparative Examples 1 to 6

Examples and comparative examples of ink compositions for writing instruments are described in reference to Table 1.

Some of the ink compositions for writing instruments include polyethylene glycol having a molecular weight of 400 as a water-soluble solvent and an acrylic resin having an amine as described above.

The viscosity values of the ink compositions for writing instruments obtained in the above examples and comparative examples are measured at 25 degrees Celsius from 1 rpm to 50 rpm using an EHD Brookfield viscometer.

Pens with the ink compositions for writing instruments described in the above-mentioned examples and comparative examples were prepared. Writing quality, drying time, stability overtime (shelf life), leakage of ink and the like are evaluated by the following evaluation method. The results are described in Table 1.

[Preparation of Pens]

Aqueous ball pens with each of the ink compositions for writing instruments describe above are prepared. Specifically, ink reservoirs (refills) manufactured by Suhan Corporation are used. Suhan refills include a polypropylene ink reservoir tube having an inner diameter of 4.8 mm and a length of 111.3 mm, and a stainless steel tip (ball diameter: 0.7 mm) and a joint adapter that connects the ink reservoir tube and the tip. Suhan refills are filled with each of the inks described in examples and comparative examples above, and ink followers mainly composed of mineral oil are loaded at the rear end surface of the inks injected.

[Evaluation Method of Writing]

Feeling of writing and written lines were evaluated by hand-writing and machine-writing for ball pens.

Evaluation Criteria

◎: Feeling of writing is soft and light, and written lines are sharp and beautiful.

○: Feeling of writing is somewhat heavy but acceptable, and written lines are acceptable.

Δ: Feeling of writing is relatively heavy, and written lines are unacceptable due to blobbing.

X: Feeling of writing is very heavy, and written lines are unacceptable due to skipping or splitting and blobbing.

[Evaluation Method of Bleeding]

Each of the ball pens with tip ball size of 0.7 mm obtained above were held with their pen tips in contact with a paper for 5 seconds to measure the diameter of the ink which was absorbed by the paper after the ink completely dried off.

The ISO 14145 papers were used for the evaluation and at least three samples are taken for the evaluation in order to obtain reliable test results.

Evaluation Criteria

◎: Diameter of the ink absorbed by the paper is around 0.3 to 0.7 mm (the diameter is not significantly different from the diameter of the ball).

○: Diameter of the ink absorbed by the paper is around 0.8 to 1.5 mm.

Δ: Diameter of the ink absorbed by the paper is around 1.5 to 2 mm.

X: Diameter of the ink absorbed by the paper is over 2 mm.

TABLE 1

| Division | | Examples | | | | Comparative Examples | | | | | |
|---|---|---|---|---|---|---|---|---|---|---|---|
| | | 1 | 2 | 3 | 4 | 1 | 2 | 3 | 4 | 5 | 6 |
| Colorant | Fuji SP series | 40 | 40 | 40 | 40 | 40 | 40 | 40 | 40 | 40 | 40 |
| thickener | Acrylate copolymer | 1.5 | 1.5 | 3.0 | 3.0 | 0.8 | 5.2 | 1.5 | 1.5 | 2.0 | 1.2 |
| | Amine | 0.2 | 0.2 | 0.4 | 0.4 | 0.1 | 0.8 | 0.2 | 0.2 | 0.3 | 0.2 |
| | Xanthan gum (keltrol) | | | | | | | | | | |
| Solvent | PEG 400 | 20 | 30 | 20 | 20 | 30 | 30 | 5 | 45 | | |
| | Propylene glycol | | | | | | | | | 30 | |
| | PEG 2000 | | | | | | | | | | 20 |
| Lubricant | Polyoxyethylene-ether phosphate | 0.5 | 0.5 | 0.5 | 0.5 | 0.5 | 0.5 | 0.5 | 0.5 | 0.5 | 0.5 |
| Preservative | PROXEL-2 | 0.3 | 0.3 | 0.3 | 0.3 | 0.3 | 0.3 | 0.3 | 0.3 | 0.3 | 0.3 |
| Rust inhibitor | Benzotriazole | 0.5 | 0.5 | 0.5 | 0.5 | 0.5 | 0.5 | 0.5 | 0.5 | 0.5 | 0.5 |
| Water | Ion-exchange water | 37 | 27 | 35.3 | 25.3 | 27.8 | 22.7 | 52 | 12 | 26.4 | 37.3 |
| Viscosity (at 25° C.) | 1 rpm | 38 | 38 | 51 | 51 | 12.8 | 781 | 25.6 | 64.0 | 23 | 26 |
| | 5 rpm | 36 | 36 | 46 | 46 | 15.4 | 410 | 12.8 | 53.8 | 23 | 21 |
| | 50 rpm | 31 | 30 | 39 | 37 | 14.6 | 187 | 6.0 | 49.7 | 22 | 21 |
| Thixotropy index (5/50 rpm) | | 1.16 | 1.20 | 1.17 | 1.24 | 1.05 | 2.19 | 1.43 | 1.08 | 1.05 | 1.05 |
| Handwriting | Feeling of writing | ◎ | ◎ | ◎ | ◎ | ○ | Δ | X | ◎ | Δ | ○ |
| | Blobbing | ◎ | ◎ | ○ | ○ | Δ | Δ | ○ | Δ | ◎ | ○ |
| Machine-writing | Skipping | ◎ | ◎ | ◎ | ◎ | ○ | ○ | ○ | ○ | ◎ | X |
| Bleeding | | ○ | ○ | ◎ | ◎ | X | ◎ | X | ○ | X | X |

As apparent from the results described in Table 1, it was found that the ink compositions for writing instruments in examples 1 to 4 of the present disclosure provide excellent feeling of writing and hand-written lines.

Referring to the comparative examples individually, in comparative example 1, in which the amount of the acrylic resin is less than 1% by weight, the ink bleeding is larger.

On the contrary, in comparative example 2, the written line is unacceptable in which the amount of the acrylic resin exceeds 5% by weight.

Furthermore, in comparative example 3, the amount of polyethylene glycol is less than 10% by weight, and the feeling of writing is unacceptable.

On the other hand, in comparative example 4, it could be found that when the amount of polyethylene glycol exceeds 40% by weight, it results in the occurrence of blobbing.

In comparative example 5, a solvent having a molecular weight of less than 200 is used, which worsens feeling of scratching, feeling of writing, and ink bleeding.

In comparative example 6, polyethylene glycol having a molecular weight of more than 1000 is used, and skipping occurs with machine-writing.

Therefore, it could be found that when polyethylene glycol having a molecular weight between 200 and 1000, having an amount between 10% by weight and 40% by weight and an acrylic resin between 1% by weight and 5% by weight are combined as in examples 1 to 4, a composition with excellent hand-written lines and feeling of writing can be obtained with an excellent ink bleeding property.

In the examples described above, it is explained that a pigment is used as a colorant, but in another embodiment, a dye may be used as a colorant. Alternatively, a combination of a pigment and a dye may be used. A pigment may be a thermochromic pigment or a glitter pigment.

In addition, in the above examples, it is described that the composition does not contain any additional thickener in addition to composition contents that exhibits the above-described thickening effect. However, in another embodiment, an optional thickener such as xanthan gum may be added as an additional thickener.

Moreover, in the above-described examples, polyethylene glycol is used. However, any other alternative materials such as polypropylene glycol may be used as long as the above-described thickening effect can be obtained. Alternatively, they may be used in combination.

What is claimed is:

1. An ink composition for a writing instrument comprising a colorant and water, wherein the ink composition further comprises a thickener including polyethylene glycol or polypropylene glycol having a molecular weight between 200 and 1000, and an acrylic resin having an amine to provide a thickening effect, the acrylic resin having the amine being ionized under alkaline conditions, and groups of the amine being hydrogen-bonded to each other and aggregated.

2. The ink composition for a writing instrument according to claim 1, wherein the amount of polyethylene glycol or polypropylene glycol is 10% by weight or more and 40% by weight or less, and the amount of acrylic resin is 1% by weight or more and 5% by weight or less.

3. The ink composition for a writing instrument according to claim 1, wherein the acrylic resin having the amine is thickened with an alkali.

4. A writing instrument comprising an ink composition for a writing instrument comprising a colorant and water, wherein the ink composition further comprises a thickener including polyethylene glycol or polypropylene glycol having a molecular weight between 200 and 1000, and an acrylic resin having an amine to provide a thickening effect, the acrylic resin having the amine being ionized under alkaline conditions, and groups of the amine being hydrogen-bonded to each other and aggregated.

* * * * *